US009479323B2

(12) United States Patent
Chiba

(10) Patent No.: US 9,479,323 B2
(45) Date of Patent: Oct. 25, 2016

(54) COMMUNICATION SYSTEM, FORWARDING NODE, CONTROL DEVICE, COMMUNICATION CONTROL METHOD, AND PROGRAM

(75) Inventor: Yasunobu Chiba, Tokyo (JP)

(73) Assignee: NEC Corporation, Tokyo (JP)

( * ) Notice: Subject to any disclaimer, the term of this patent is extended or adjusted under 35 U.S.C. 154(b) by 118 days.

(21) Appl. No.: 13/982,232

(22) PCT Filed: Sep. 21, 2011

(86) PCT No.: PCT/JP2011/005303
§ 371 (c)(1),
(2), (4) Date: Aug. 14, 2013

(87) PCT Pub. No.: WO2012/101689
PCT Pub. Date: Aug. 2, 2012

(65) Prior Publication Data
US 2013/0322440 A1    Dec. 5, 2013

(30) Foreign Application Priority Data

Jan. 28, 2011   (JP) .................................. 2011-016323

(51) Int. Cl.
*H04L 12/28*   (2006.01)
*H04L 7/00*    (2006.01)
(Continued)

(52) U.S. Cl.
CPC ................ *H04L 7/00* (2013.01); *H04L 45/42* (2013.01); *H04L 49/3009* (2013.01)

(58) Field of Classification Search
CPC ..... H04L 45/38; H04L 45/745; H04L 45/34; H04L 43/00; H04L 63/0227; H04L 43/022; H04L 69/22; H04L 45/44
See application file for complete search history.

(56) References Cited

U.S. PATENT DOCUMENTS 5,765,172 A    6/1998  Fox
7,362,700 B2 *  4/2008 Frick et al. .................... 370/219
(Continued)

FOREIGN PATENT DOCUMENTS

JP    H 09-098189 A     4/1997
JP    2009-505449 A     2/2009
(Continued)

OTHER PUBLICATIONS

"OpenFlow Switch Specification" Version 1.1.0. (Wire Protocol 0x01) Dec. 31, 2009 [Searched on Dec. 22, 2010], Internet <URL: http://www.openflowswitch.org/documents/openflow-spec-v1.0.0.pdf>.

(Continued)

*Primary Examiner* — Brian O'Connor
(74) *Attorney, Agent, or Firm* — McGinn IP Law Group, PLLC

(57) ABSTRACT

A communication system includes a control device, a forwarding node, and a confirmation unit. The control device sets a forwarding path of a packet and determines processing rules corresponding to the forwarding path. The forwarding node includes a processing unit that processes a received packet by a processing rule transmitted from the control device, and a matching information processing unit that adds matching information, which represents information on processing for the received packet, to the received packet and forwards the received packet. The confirmation unit confirms if the forwarding node and the control device are synchronized according to whether the matching information added to the received packet matches pre-calculated matching information.

22 Claims, 15 Drawing Sheets

(51) Int. Cl.
*H04L 12/935* (2013.01)
*H04L 12/717* (2013.01)

(56) References Cited

U.S. PATENT DOCUMENTS

| | | | | |
|---|---|---|---|---|
| 7,669,234 B2* | 2/2010 | Buer | ............... | G06F 17/30949 370/389 |
| 7,788,721 B2* | 8/2010 | Suzuki et al. | ............... | 726/22 |
| 7,843,827 B2* | 11/2010 | Hurley et al. | ............... | 370/232 |
| 8,503,307 B2* | 8/2013 | Tourrilhes et al. | ............... | 370/237 |
| 8,750,163 B2* | 6/2014 | Awano | ............... | 370/254 |
| 8,832,272 B2* | 9/2014 | Ueno | ............... | 709/225 |
| 8,842,673 B2* | 9/2014 | Akiyoshi | ............... | 370/392 |
| 8,842,674 B2* | 9/2014 | Akiyoshi | ............... | 370/392 |
| 8,897,134 B2* | 11/2014 | Kern et al. | ............... | 370/235 |
| 2007/0177600 A1* | 8/2007 | Suzuki et al. | ............... | 370/392 |

FOREIGN PATENT DOCUMENTS

| | | |
|---|---|---|
| JP | 2009-510566 A | 3/2009 |
| WO | WO 2008/095010 A1 | 8/2008 |

OTHER PUBLICATIONS

Nick McKeown et al, "OpenFlow: Enabling Innovation in Campus Networks", Mar. 14, 2008 [Searched on Dec. 22, 2010], Internet <URL: http://www.openflowswitch.org//documents/openflow-wp-latest.pdf>.

International Search Report in PCT/JP2011/005303 dated Nov. 22, 2011.

Chinese Office Action dated Mar. 18, 2015 with an English Translation thereof.

"New Internet Innovation Army-OpenFlow Consortium", China Education Network, 12th Issue of 2008, pp. 26-27, Dec. 31, 2008 (with an English translation thereof).

Japanese Office Action dated Aug. 18, 2015.

* cited by examiner

FIG. 5

| Priority | Matching rule | Actions | Matching information |
|---|---|---|---|
| 65535 | A | Output to Port #9 | 0x0ceb |
| ... | ... | ... | ... |
| 2048 | B | Output to Port #7 | 0xff01 |
| ... | ... | ... | ... |
| 32 | X | Output to Port #2 | 0xa310 |
| ... | ... | ... | ... |

FIG. 8

| DPID | Priority | Matching rule | Actions | Matching information |
|---|---|---|---|---|
| 1 | 65535 | A | Output to Port #9 | N/A |
| 2 | 65535 | A | Output to Port #6 | 0xa92b |
| 3 | 65535 | A | Output to Port #1 | 0x0ceb |
| 1 | 4096 | B | Output to Port #7 | N/A |
| 2 | 2048 | B | Output to Port #4 | 0x349a |
| 3 | 4096 | B | Output to Port #3 | 0xff01 |
| 1 | 32 | X | Output to Port #2 | N/A |
| 2 | 32 | X | Output to Port #5 | 0x945d |

FIG. 15

HEADER FIELD; MATCHING RULE

| Wildcards | In Port | Ether SA | Ether DA | Ether type | VLAN ID | VLAN PCP | IP SA | IP DA | IP proto | IP ToS bits | TCP/UDP src port | TCP/UDP dst port | Counters | Actions |

COMMUNICATION SYSTEM, FORWARDING NODE, CONTROL DEVICE, COMMUNICATION CONTROL METHOD, AND PROGRAM

CROSS-REFERENCE TO RELATED APPLICATIONS

The present invention claims priority from Japanese Patent Application 2011-016323(filed on Jan. 28, 2011) the content of which is hereby incorporated in its entirety by reference into this specification.

The present invention relates to a communication system, a forwarding node, a control device, a communication control method, and a program, and more particularly to a communication system having a control device for integrally controlling forwarding node(s) arranged in a network, a forwarding node, a control device, a communication control method, and a program.

BACKGROUND

In a communication system where a control device integrally controls forwarding node(s) for carrying out communication, the forwarding node(s) and the control device must be synchronized with each other. This is because, if the control device and the forwarding node(s) are not synchronized, a packet-forwarding method instruction transmitted from the control device to a forwarding node becomes inconsistent with the packet forwarding processing performed by the forwarding node, with the result that the packet forwarding not intended by the control device is performed.

As a communication system where the control device integrally controls the forwarding node(s) as described above, the technology called OpenFlow is known (see Patent Literature 1 and Non Patent Literatures 1 and 2). OpenFlow identifies communications as end-to-end flows and performs path control, failure recovery, load balancing, and optimization on a per-flow basis. An OpenFlow switch, which is specified in Non Patent Literature 2, has a secure channel for communication with an OpenFlow controller that serves as a control device, and operates according to the flow table to which information is added, and whose contents are rewritten, according to an instruction from the OpenFlow controller as necessary. In the flow table, a set of the following three is defined for each flow: a matching rule (Header Fields) against which a packet header is matched, flow statistical information (Counters), and an action(s) (Actions) that defines processing contents (see FIG. 15).

For example, when a packet is received, the OpenFlow switch searches the flow table for an entry that has a matching rule (see Header fields in FIG. 15) that matches the header information of the received packet. If an entry matching the received packet is found as a result of the search, the OpenFlow switch updates the flow statistical information (Counters) and, at the same time, performs the processing contents (packet transmission from a specified port, flooding, drop, etc.), described in the Actions field of the entry, for the received packet. On the other hand, if an entry matching the received packet is not found as a result of the search, the OpenFlow switch forwards the received packet to the OpenFlow controller via the secure channel, requests the OpenFlow controller to determine a packet path based on the transmission source/destination of the received packet, receives a flow entry for the packet path, and updates the flow table. In this way, the OpenFlow switch forwards a packet using an entry, stored in the flow table, as the processing rule.

However, Patent Literature 1 and Non Patent Literatures 1 and 2 described above do not include a practical study on how to confirm the synchronization between the OpenFlow controller and the OpenFlow switch.

In addition, Patent Literature 2 discloses the technology for confirming if data held in a mobile device and data stored in the database to which the mobile device is connected are synchronized. According to this literature, a mobile device generates a hash for the data held in the mobile device and forwards the generated hash to the synchronization server to request it to confirm if the data is synchronized. The synchronization server generates a hash for the data for which synchronization confirmation is requested. The synchronization server compares the hash, transmitted from the mobile device, with the hash generated by the synchronization server. The synchronization server confirms data synchronization based on the comparison result. This literature describes that the transmission time and the bandwidth required for synchronization confirmation may be reduced by generating a hash from the data for which synchronization confirmation is required and performing synchronization confirmation based on the hash.

[Patent Literature 1]
International Publication No. WO2008/095010
[Patent Literature 2]
Japanese Patent Tokuhyo Publication No. JP2009-510566A
[Non Patent Literature 1]
Nick McKeown and seven other authors, "OpenFlow: Enabling Innovation in Campus Networks, [online], [Searched on Dec. 22, 2010], Internet <URL: http://www.openflowswitch.org//documents/openflow-wp-latest.pdf.>
[Non Patent Literature 2]
"Openflow Switch Specification" Version 1.0.0. (Wire Protocol 0x01) [Searched on Dec. 22, 2010], Internet <URL: http ://www.openflowswitch./org/documents/openflow-spec-v1.0.0.pdf>

SUMMARY

The following analysis is given by the present invention. As described above, Patent Literature 1 and non-Patent Literatures 1 and 2 describe a technology that only provides control messages, called Stats Request/Reply, for retrieving the contents of flow tables, or used to transmit the contents of flow entries as a response (see "5.3.5 Read State Messages" in Non Patent Literature 2) but not a method for efficiently confirming synchronization between a forwarding node and the control device.

The technology disclosed in Patent Literature 2 compares the hash data (database hashes) each of which represents respective database and, if a mismatch is detected as a result of the comparison, performs confirmation of synchronization (comparison of record hashes) per each piece of data held in a mobile device.

In a communication system where a control device integrally controls forwarding nodes for carrying out communication, synchronization confirmation, if performed by the method such as Stats Request/Reply disclosed in Non Patent Literature 2 or by the method disclosed in Patent Literature 2, will generate a problem that network traffic is generated for confirming synchronization between the control device and the forwarding node(s) and, therefore, the load of the control device or the forwarding nodes will further increase.

In addition, it should be taken into consideration that an increase in the number of forwarding nodes to be controlled will result in an exponential increase in the load of the control device.

It is an object of the present invention to provide an efficient method for confirming synchronization between a forwarding node and the control device in a communication system where the control device integrally controls the forwarding nodes for communication.

According to a first aspect, there is provided a communication system comprising: a control device that sets a forwarding path of a packet and determines processing rules corresponding to the forwarding path; a forwarding node that includes a processing unit that processes a received packet by a processing rule transmitted from the control device, and a matching information processing unit that adds matching information. The matching information represents information on processing for the received packet, to the received packet and forwards the received packet. The communication system further comprises a confirmation unit that confirms if the forwarding node and the control device are synchronized according to whether the matching information added to the received packet matches pre-calculated matching information.

According to a second aspect, there is provided a forwarding node, comprising: a processing unit that processes a received packet by a processing rule transmitted from a control device; and a matching information processing unit that adds matching information, which represents information on processing for the received packet, to the received packet and forwards the received packet. The forwarding node further comprises a confirmation unit that confirms if the forwarding node and the control device are synchronized according to whether the matching information added to the received packet matches pre-calculated matching information.

According to a third aspect, there is provided a control device that causes the forwarding node to perform the confirmation operation of the synchronization state of the processing rules using the matching information, or a control device that performs the confirmation operation of the synchronization state of the processing rules with the forwarding node using the matching information received from the forwarding node.

Particularly there is provided a control device comprising:
a unit (means) that sets a forwarding path of a packet and forwards a processing rule corresponding to the forwarding path to a forwarding node that processes the packet by the processing rule;
 a receiving unit (means) that receives matching information, which represents information on processing for a received packet, from a forwarding node that processes the received packet by the processing rule; and
 a confirmation unit that confirms if said forwarding node and said control device are synchronized according to whether the matching information, received from the forwarding node, matches pre-calculated matching information.

According to a fourth aspect, there is provided a communication control method comprising: generating, by a forwarding node, matching information and adding the generated matching information to a received packet, the forwarding node performing packet processing according to a processing rule that is set by a control device, the matching information representing information on processing for the received packet; and a confirming if the forwarding node and the control device are synchronized according to whether the matching information added to the received packet matches pre-calculated matching information. This method is linked to a forwarding node and to a special machine called a control device that integrally controls forwarding nodes.

According to a fifth aspect, there is provided a program causing a computer, installed on a forwarding node that performs packet processing according to a processing rule that is set by a control device, to execute processing of adding matching information to a received packet, the matching information representing information on processing for the received packet; and processing of confirming if the forwarding node and the control device are synchronized according to whether the matching information added to the received packet matches pre-calculated matching information. This program may be recorded on (or embodied in) a computer-readable storage medium which may be non-transient. That is, the present invention may be implemented as a computer program product.

The program may perform (or assume) the physical and electronical, in general technical function(s) to be performed by the forwarding node, controlling device, and/or communication system, at least partly thereof.

The meritorious effects of the present invention are summarized as follows. The present invention allows synchronization confirmation to be performed efficiently between a forwarding node and a control device in a communication system where the control device integrally controls the forwarding nodes for carrying out communication.

BRIEF DESCRIPTION OF DRAWINGS

FIG. 5 is a diagram showing an example of a table held in the processing rule storage unit of the forwarding node in the first exemplary embodiment of the present disclosure.

FIG. 8 is a diagram showing an example of a table held in the processing rule storage unit of the control device in the first exemplary embodiment of the present disclosure. FIG. 15 is a diagram showing the configuration of a flow entry described in Non Patent Literature 2.

PREFERRED MODES

Figure 1:
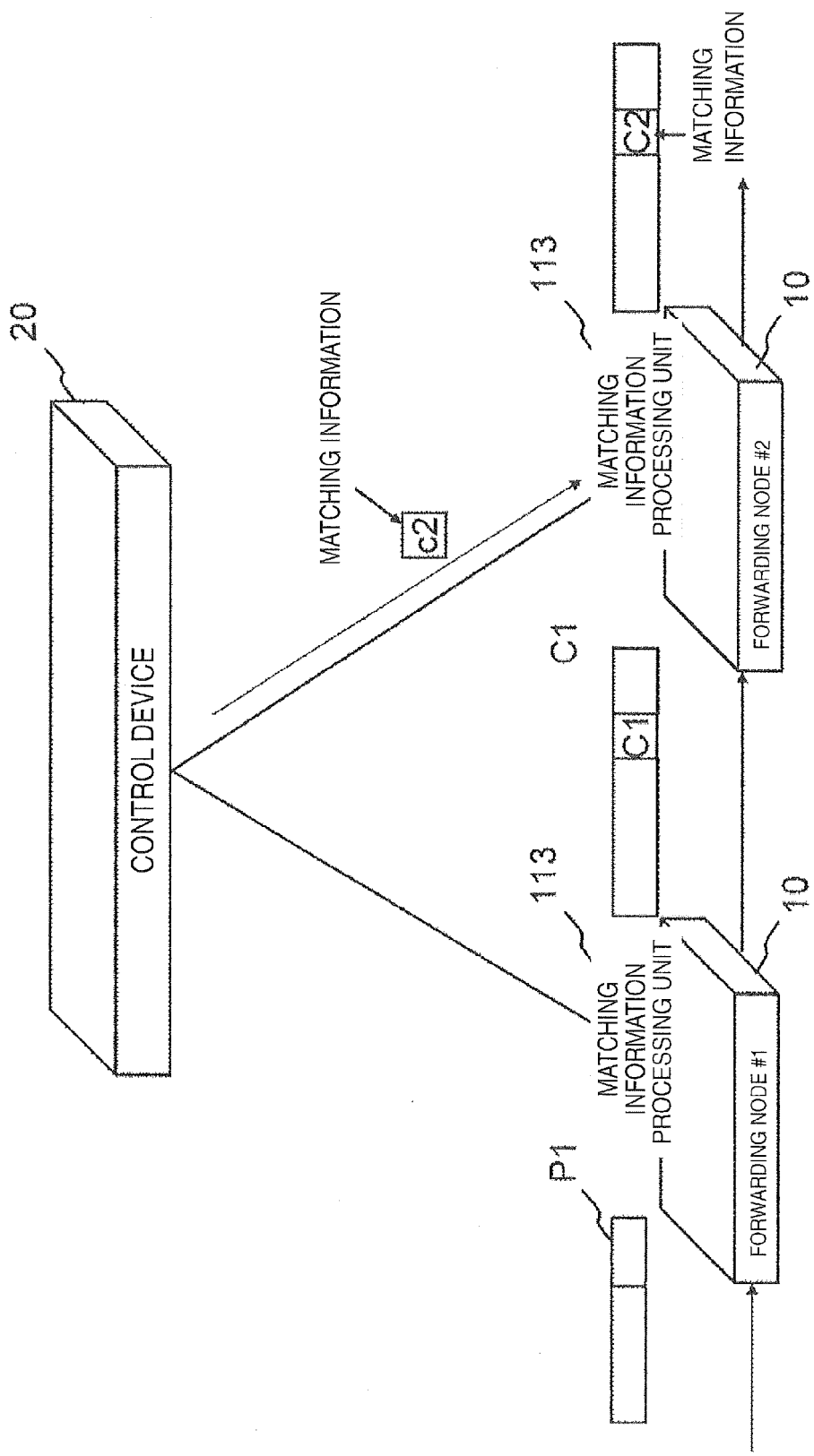
FIG. 1 is a diagram showing the outline of an exemplary mode of the present disclosure.

First, the following describes the outline of an exemplary mode of the present disclosure. As shown in FIG. 1, the present disclosure may be implemented by a configuration comprising a control device 20 and forwarding nodes 10. The control device 20 sets processing rules, which perform packet processing according to a predetermined packet forwarding path, in multiple forwarding nodes. The forwarding node 10 processes a received packet according to a processing rule that is set by the control device. Note that the drawing reference numerals in the outline are attached to the elements for convenience as an example to help understanding of the present disclosure but are not intended to limit the present disclosure to the mode shown in the drawings.

The forwarding node 10 (see forwarding node #1 and forwarding node #2 in FIG. 1) comprises a matching information processing unit 113 that, when forwarding a received packet, adds matching information (see "C1" and "C2" in FIG. 1), which represents information on the processing for the received packet, to the received packet. The matching information processing unit 113 of a predetermined forwarding node 10 (for example, forwarding node #2 in FIG. 1) confirms synchronization between the forwarding node and the control device by checking if the matching information "C2" added by the forwarding node itself matches the pre-calculated content "c2". Of course, the matching information processing unit 113 of a predetermined forwarding node 10 (for example, forwarding node #2 in FIG. 1) may confirm synchronization between the forwarding node and the control device by checking if the matching information "C1" included in the received packet matches the pre-calculated content "c1"

The matching information, used by the forwarding node 10 to confirm synchronization between the forwarding node 10 and the control device 20, is included in a packet and is forwarded with the packet. This forwarding method therefore reduces synchronization-confirmation transactions generated between the forwarding node 10 and the control device 20. As a result, the state of synchronization of processing rules between the forwarding node 10 and control device 20 may be confirmed readily using an actual flow.

Figure 2:
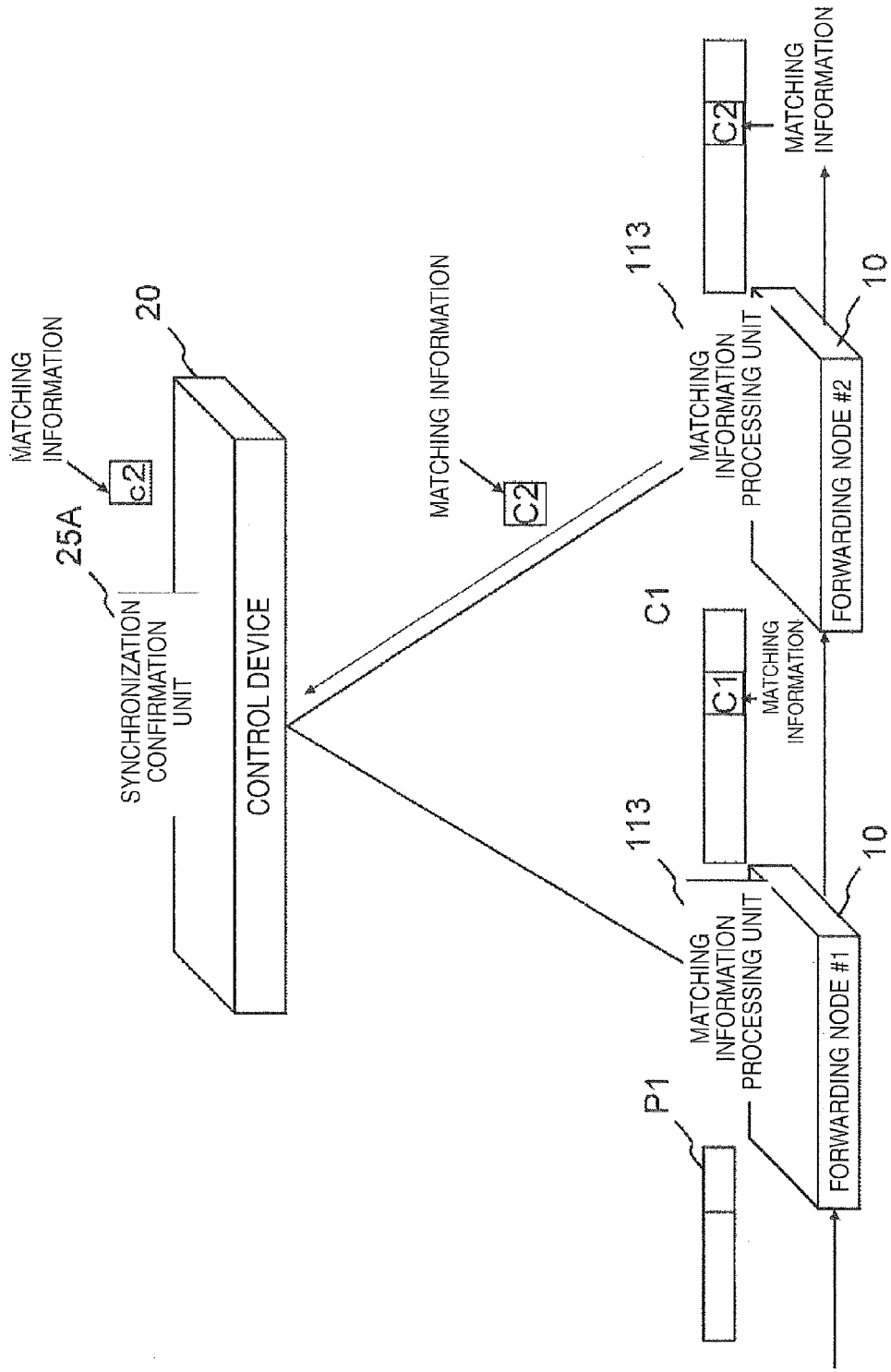
FIG. 2 is another diagram showing the outline of an exemplary mode of the present disclosure.

Synchronization confirmation using the matching information described above may be performed not only by the forwarding node 10 as shown in FIG. 1 but by the control device 20. For example, as shown in FIG. 2, a configuration is also possible in which the matching information processing unit 113 of a predetermined forwarding node 10 (for example, forwarding node #2 in FIG. 1) forwards the matching information "C2", added by the forwarding node itself, to the control device 20 and a synchronization confirmation unit 25A provided in the control device 20 confirms synchronization between the forwarding node and the control device by checking if the matching information "C2" matches the pre-calculated contents "c2".

As the matching information described above, any information that can distinguish each forwarding node may be used; for example, the identifier or the MAC (Media Access Control) address of the forwarding node 10 or the link ID attached to the interface of the forwarding node 10 may be used. Instead of these types of information, the processing rule, or its part, used by each node for processing the packet may be used. As the mode for attaching matching information to a user packet, various modes may be employed; for example, the matching information is not only embedded in the header part of a user packet as shown in FIG. 1 and FIG. 2 but added to a user packet as an additional header (see FIG. 6, FIG. 7, and FIG. 14).

(First exemplary embodiment)

Figure 3:
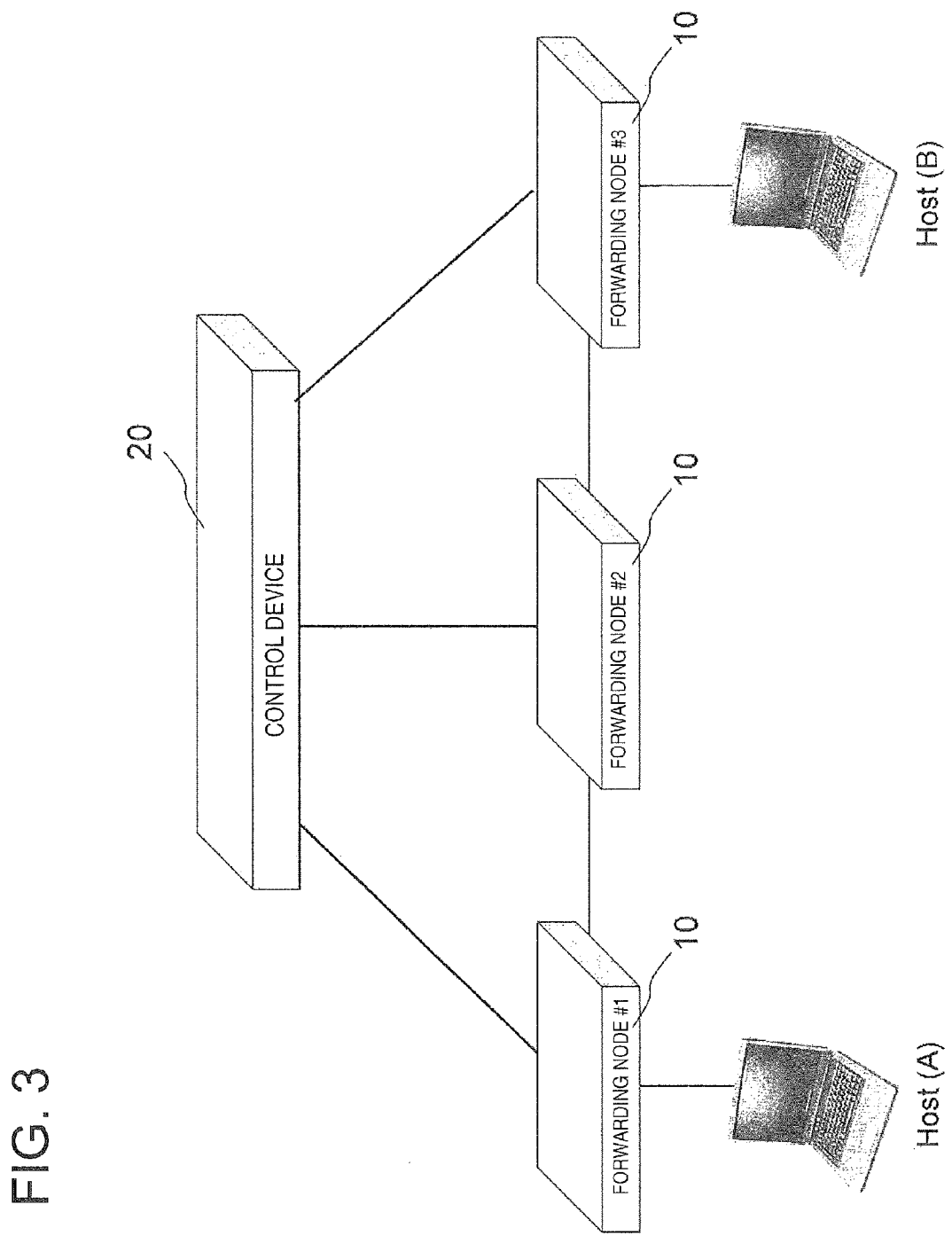
FIG. 3 is a diagram showing the configuration of a first exemplary embodiment of the present disclosure.

Next, a first exemplary embodiment of the present disclosure will be described in detail with reference to the drawings. FIG. 3 is a diagram showing the configuration of a communication system in the first exemplary embodiment of the present disclosure. Referring to FIG. 3, three forwarding nodes 10, a control device 20, and hosts (host terminals Host(A), Host(B)) that communicate with each other via the forwarding nodes 10 are shown. Although the three forwarding nodes 10, control device 20, and two hosts (Host(A), Host(B)) are shown in the example in FIG. 3, the numbers of forwarding nodes, control devices, and hosts are exemplary only and any number of forwarding nodes, control devices, and hosts may be used.

Figure 4:
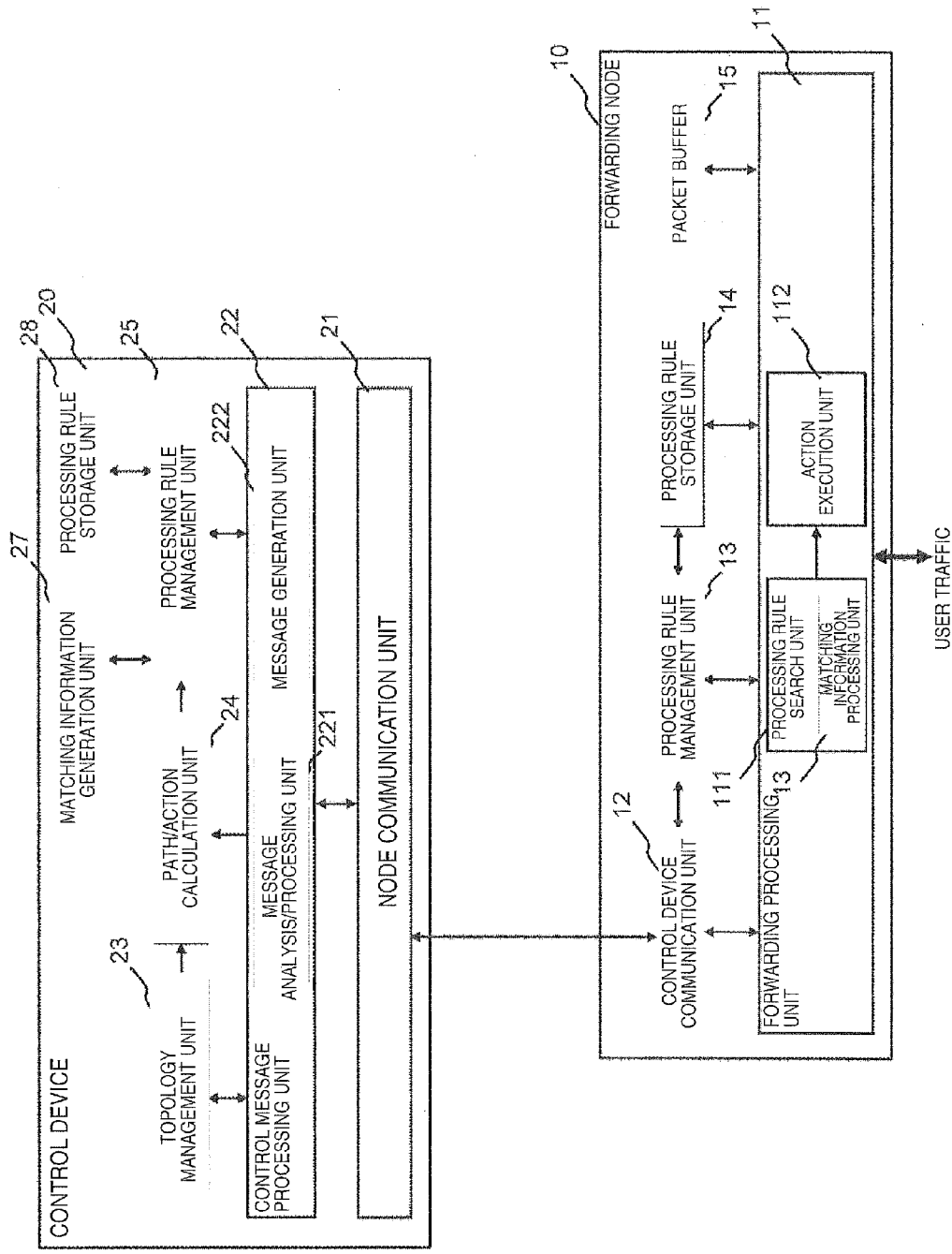
FIG. 4 is a block diagram showing the detailed configuration of a control device and a forwarding node in the first exemplary embodiment of the present disclosure.

FIG. 4 is a block diagram showing the detailed configuration of the forwarding node 10 and the control device 20. Referring to FIG. 4, the forwarding node 10 comprises a forwarding processing unit 11, a control device communication unit 12 that communicates with the control device 20, a processing rule management unit 13 that manages a processing rule storage unit 14, and a packet buffer 15. Note that forwarding node 10 is not always required to comprise the packet buffer 15. FIG. 5 is a diagram showing an example of a processing rule storage table held in the processing rule storage unit 14. The Priority field indicates the priority of each processing rule. Matching Rule and Actions (Actions) correspond respectively to Matching Rule (Matching rule) and Actions (Actions) of a flow entry of the OpenFlow switch shown in FIG. 15. The matching information (piece of information data to be used for matching) field stores a value that represents a processing rule stored in the forwarding node (hereinafter called "matching information"). This value is generated using a predetermined function (for example, a hash function such as Message Digest Algorithm 5 (MD5)) that uses, as its argument, the value of a specific field (for example, Matching Rule and Action (Actions)) of each processing rule. Although the matching information field contains a value in the example in FIG. 5, the matching information field may contain a null value (empty blank). If the matching information field of a processing rule that is set by the control device 20 does not contain a value, synchronization confirmation using the matching information, which will be described later, is omitted. Note that the format of the table in FIG. 5 is exemplary only. The processing rule storage table of the present disclosure is not limited to those based on the OpenFlow technology.

The flow statistical information (Stats) field, though omitted in the example in FIG. 5, may be added (Note that flow statistical information (Stats), which varies each time a packet is received, is not used for creating the matching information). Therefore, the processing rule storage table in FIG. 5 is a table created by adding the priority field and the matching information field to a flow entry of the OpenFlow switch described in Non Patent Literature 2.

The forwarding processing unit 11 comprises a processing rule search unit 111 and an action execution unit 112. The processing rule search unit 111 outputs the processing content (Actions) of a processing rule, which has a matching rule (Matching Rule) that matches a received packet, from the processing rule storage unit 14 with the configuration described above to the action execution unit 112. The action execution unit 112 executes the processing content (Actions)

output from the processing rule search unit 111. The processing rule search unit 111 further comprises a matching information processing unit 113.

If matching information is included in a received user packet, the matching information processing unit 113 uses this matching information and the information, which indicates that processing has been performed for the device itself, to add new matching information to the received packet.

The matching information to be added by the matching information processing unit 113 may be calculated, for example, by (Expression 1) and (Expression 2) given below.

$$C_n = f(C_{n-1}, \text{FlowEntry}_n) \quad \text{(Expression 1)}$$

$$C_n = \{h_n, h_{n-1}, h_{n-2}, h_{n-3}, \ldots, h_0\}$$

$$h_n = f(\text{FlowEntry}_n) \quad \text{(Expression 2)}$$

where, $C_n$ is the matching information generated by the n-th forwarding node #n on the packet forwarding path, and $C_{n-1}$ is the matching information included in a received packet and generated by the (n−1)th forwarding node #n−1. FlowEntry$_n$ indicates the value of a specific field in the processing rule (for example, Matching Rule and Actions) that the n-th forwarding node #n on the packet forwarding path searches for from the processing rule storage unit 14 as the value corresponding to the user packet. As the function f(X), a hash function such as MD5 may be used. By using such a hash function, the matching information $C_n$ becomes a value uniquely representing a combination of processing rules that the user packet has experienced (i.e. processing rules applied in respective one of the forwarding nodes). Instead of Matching Rule and Actions given above, Flow Cookie etc. described in Non Patent Literature 2 may also be used.

If the matching rule field of the processing rule searched for by the processing rule search unit 111 includes a value as shown in FIG. 5, the matching information processing unit 113 compares the matching information $C_n$, calculated as described above, with the matching rule field in the processing rule that is set by the control device 20. If a mismatch is found as a result of the comparison, the matching information processing unit 113 reports a synchronization failure (out of synchronization) to the control device 20.

Figure 6:
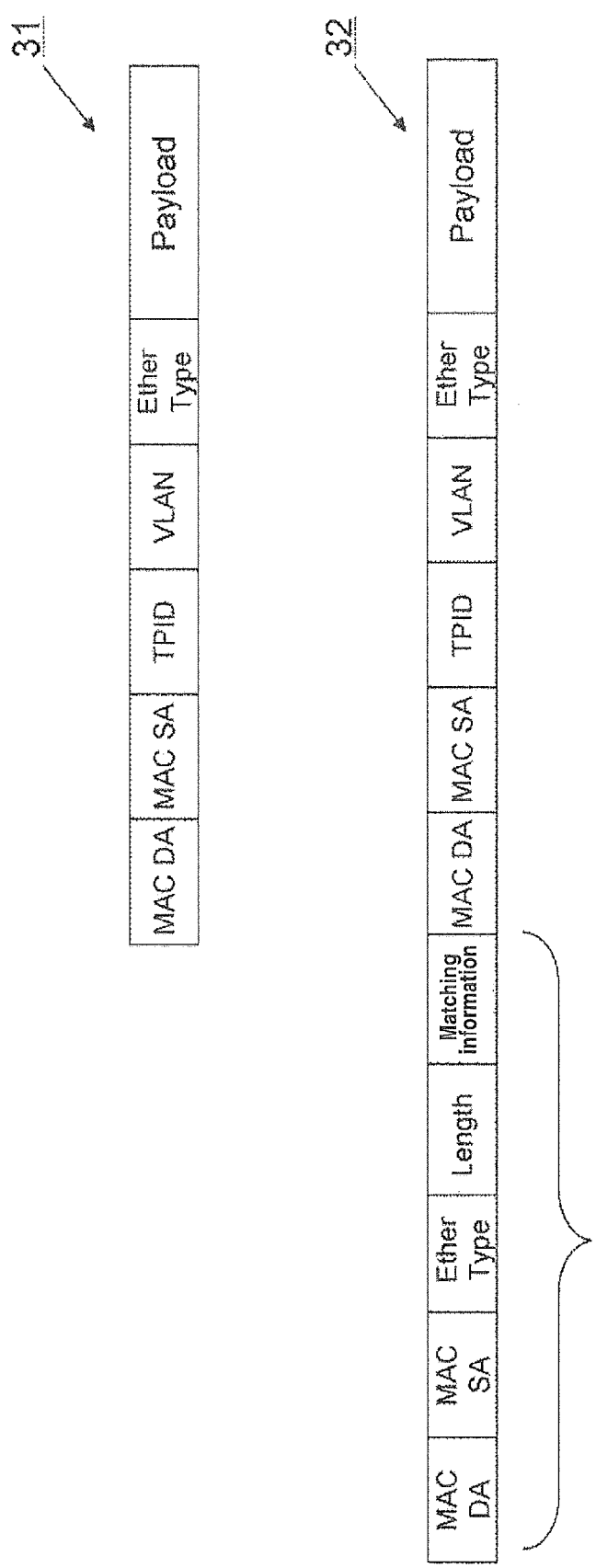
FIG. 6 is a diagram showing an example of a packet that includes matching information (to which matching information is added).

FIG. 6 is a diagram showing an example of the configuration of a packet which is created by the forwarding node 10 and to which the matching information is added. In the example in FIG. 6, a packet 32, to which the matching information is added, has the configuration in which a matching information storage header 33, which includes the matching information, is added to the start of a user packet 31.

Figure 7:
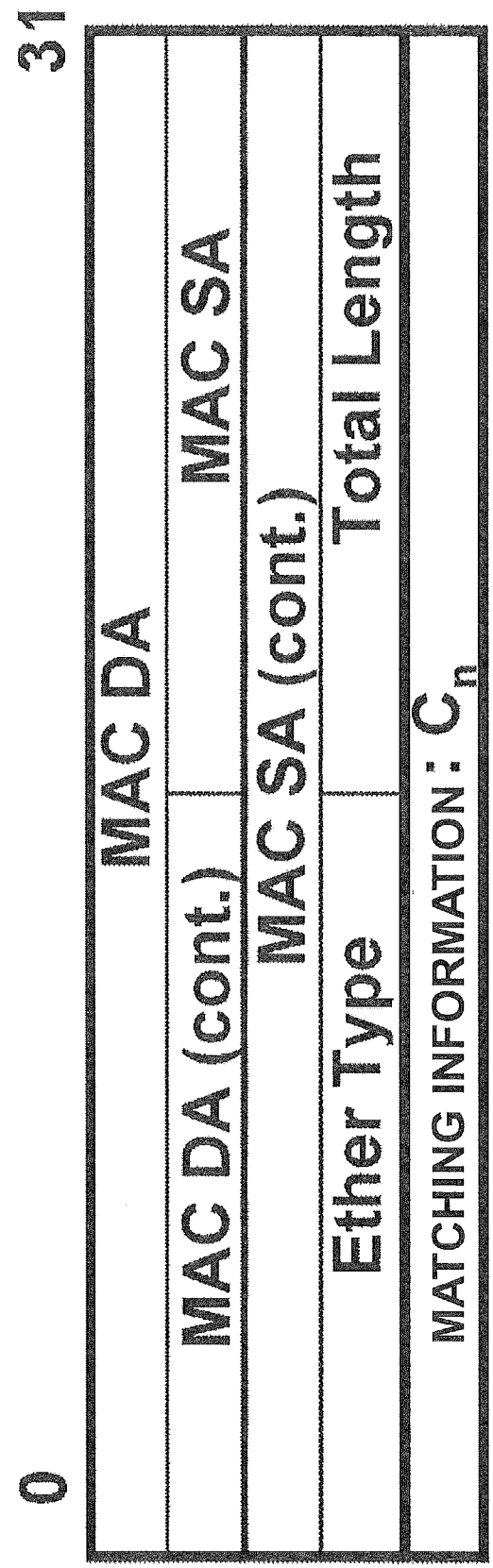
FIG. 7 is a diagram showing an example of the configuration of the matching information storage header shown in FIG. 6.

FIG. 7 is a diagram showing an example of the configuration of the matching information storage header 33 described above. In the example in FIG. 7, the matching information storage header 33 has the configuration in which the matching information $C_n$ is added after the MAC destination address (MAC DA), MAC source address (MAC SA), upper-level protocol type (Ether Type), and the total header length (Total Length).

The forwarding node 10, such as the one described above, can be implemented by the configuration in which the matching information field is added to the flow table of the OpenFlow switch described in Non Patent Literature 2 and by adding the matching information processing unit 113. The above-described function corresponding to the forwarding processing unit 11 of the forwarding node 10, which includes the matching information processing unit 113, may also be implemented by a program executed by the computer that configures the forwarding node 10.

Referring again to FIG. 4, the following describes the configuration of the control device 20. The control device 20 comprises a node communication unit 21 that carries out communication with the forwarding node 10; a control message processing unit 22; a topology management unit 23 that creates network topology information based on the connection relation of the forwarding node 10 collected via the node communication unit 21; a path/action calculation unit 24 that determines a packet forwarding path and actions to be executed by the forwarding nodes 10 on the forwarding path based on the network topology information created by the topology management unit 23; a processing rule management unit 25 that performs management so that the contents of the processing rule storage unit 28 become consistent with the contents of the processing rule storage unit 14 of each forwarding node 10 when a processing rule is set in the forwarding node 10 or when a processing rule timeout notification is received from the forwarding node 10; a matching information generation unit 27; and a processing rule storage unit 28.

In addition, the control message processing unit 22 comprises a message analysis/processing unit 221 that analyzes a control message received from the forwarding node 10 and performs necessary processing; and a message generation unit 222 that generates a message to be transmitted to the forwarding node 10.

The matching information generation unit 27 is a means that generates matching information based on a request from the processing rule management unit 25 wherein the matching information is set in the matching information field of a processing rule that is set in a forwarding node that performs synchronization confirmation. As the method for actually calculating the matching information, the calculation method employed by the matching information processing unit 113 described above may be used.

FIG. 8 is a diagram showing an example of the processing rule storage table held in the processing rule storage unit 28 of the control device 20. As shown in FIG. 8, the processing rule storage unit 28 of the control device 20 holds all processing rules that are held in the processing rule storage units 14 of the forwarding nodes 10 controlled by the control device 20. For example, the first to third entries from the top of the table in FIG. 8 indicate, for a flow where the matching rule is A, the processing rules that are set in the nodes whose DPIDs (identifier of node 10: Datapath Identifier) are 1 to 3 (the fourth to sixth entries from the top indicate the processing rules in the same way). Although stored with a matching rule as the key in the example in FIG. 8, the processing rules may also be stored with the DPID, etc., as the key.

When a packet that matches the matching rule "A", as indicated by the first entry from the top of the table described above, is received, the node whose DPID is 1 (for example, node #1 in FIG. 3) performs the processing to output from the ninth port according to the Actions field. When a packet that matches the matching rule "A" is received from the node whose DPID is 1 (for example, node #1 in FIG. 3), the node whose DPID is 2 (for example, node #2 in FIG. 3) performs the processing to output from the sixth port. When a packet that matches the matching rule "A" is received from the node whose DPID is 2 (for example, node #2 in FIG. 3), the node whose DPID is 3 (for example, node #3 in FIG. 3) performs the processing to output from the first port. In this way, the control processing is performed to forward a packet, which matches the matching rule "A", via a specified path.

In the example in FIG. 8, the node whose DPID is 1 (for example, forwarding node #1 in FIG. 3) adds the matching information to the packet because the matching information field contains a null value. The node whose DPID is 2 or 3 (for example, forwarding nodes #2 or #3 in FIG. 3) adds the matching information to the packet and, at the same time, confirms if the generated matching information matches the matching information field in the processing rule because the matching information field contains a value. As described above, each forwarding node 10 performs the packet forwarding processing as well as the matching information re-addition processing. In addition, if a value is set in the matching information field, the forwarding node performs the synchronization confirmation processing using the added matching information.

Although the processing rule storage unit 28 is included in the control device 20 in the configuration shown in FIG. 4, another configuration may be employed in which the processing rule storage unit 28 is included in an external server provided separately.

Based on the OpenFlow controller described in Non Patent Literatures 1 and 2, the control device 20 described above may be implemented by adding the matching information generation function described above. Note that the control device 20 is not limited to the configuration based on OpenFlow. The function corresponding to the processing rule management unit 25 and the matching information generation unit 27 of the control device 20 described above may also be implemented by the program(s) executed by a computer that configures the control device 20.

Figure 9:
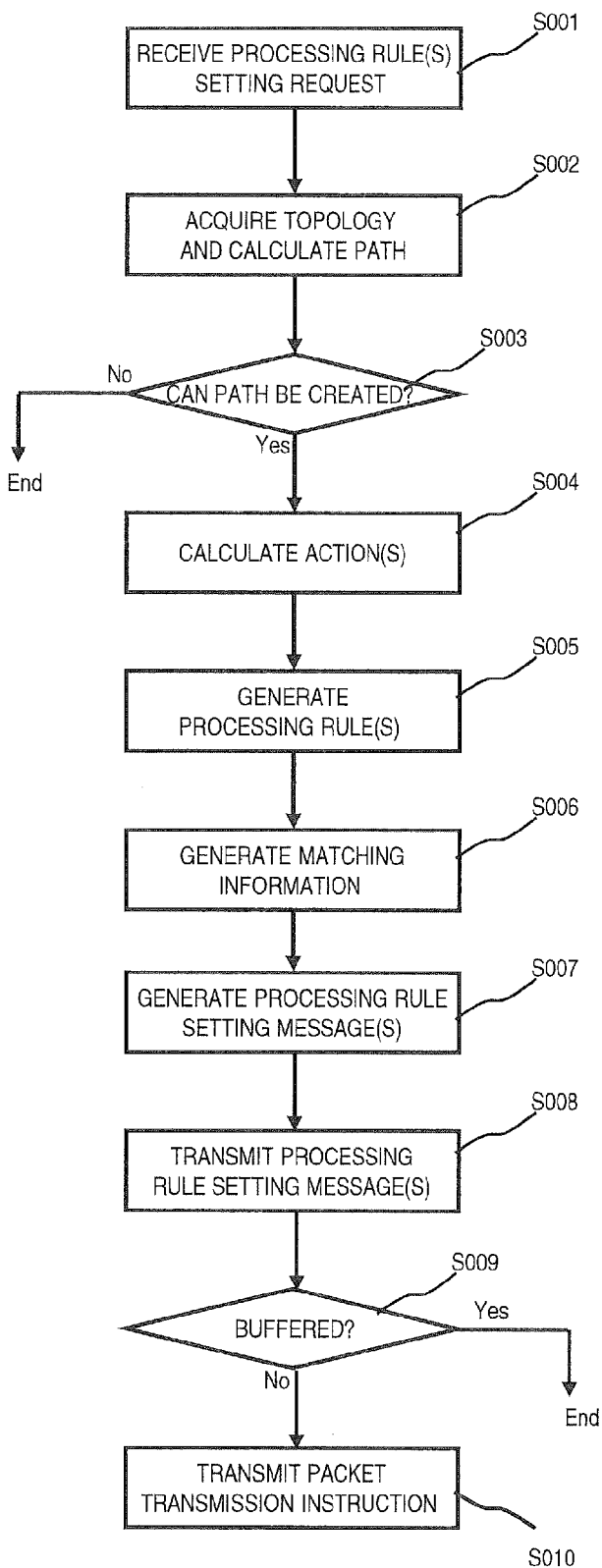
FIG. 9 is a flowchart showing the operation that is performed when the control device in the first exemplary embodiment of the present disclosure accepts a processing rule setting request.

Next, the following describes the operation of the control device 20 and the forwarding node 10 described above. FIG. 9 is a flowchart showing the operation that is performed when the control device 20 described above accepts a processing rules setting request. Referring to FIG. 9, when a processing rules setting request is received from the forwarding node 10 (see step S110 in FIG. 10) (step S001), the control device 20 acquires the network topology information, built by the topology management unit 23, and calculates the packet forwarding path (step S002).

Except when it is determined, as a result of the calculation of the forwarding path of the packet, that the packet cannot be forwarded because the path cannot be created or a node on the path fails (No in step S003), the control device 20 calculates actions corresponding to the calculated forwarding path (step S004). Next, the control device 20 creates a matching rule for identifying the flow, to which the packet associated with the setting of the processing rules belongs, and generates processing rules (without matching information) to be applied to the forwarding nodes 10 on the forwarding path (step S005). In addition, the control device 20 generates matching information to be set in the matching information field of the processing rules of the forwarding nodes 10 that are on the path and that will perform synchronization confirmation (step S006).

When the generation of the processing rules and the matching information is completed, the control device 20 generates processing rule setting messages (step S007) and forwards the processing rule setting messages to the forwarding nodes 10 on the forwarding path (step S008).

After that, if the forwarding node 10 does not buffer the packet (No in step S009), the control device 20 transmits a packet transmission instruction (Packet-Out) (step S010). This packet transmission instruction specifies the packet to be transmitted (packet received in step S001) and actions to be executed for the packet (assignment of matching information and output from the specified port) or the packet to be transmitted (packet received in step S001) and the actions to be executed for the packet (search the processing rule storage unit 14). If the forwarding node 10 buffers the packet (Yes in step S009), the forwarding node 10 can transmit the packet by itself as will be described later and, therefore, the processing of the control device 20 is omitted.

Figure 10:
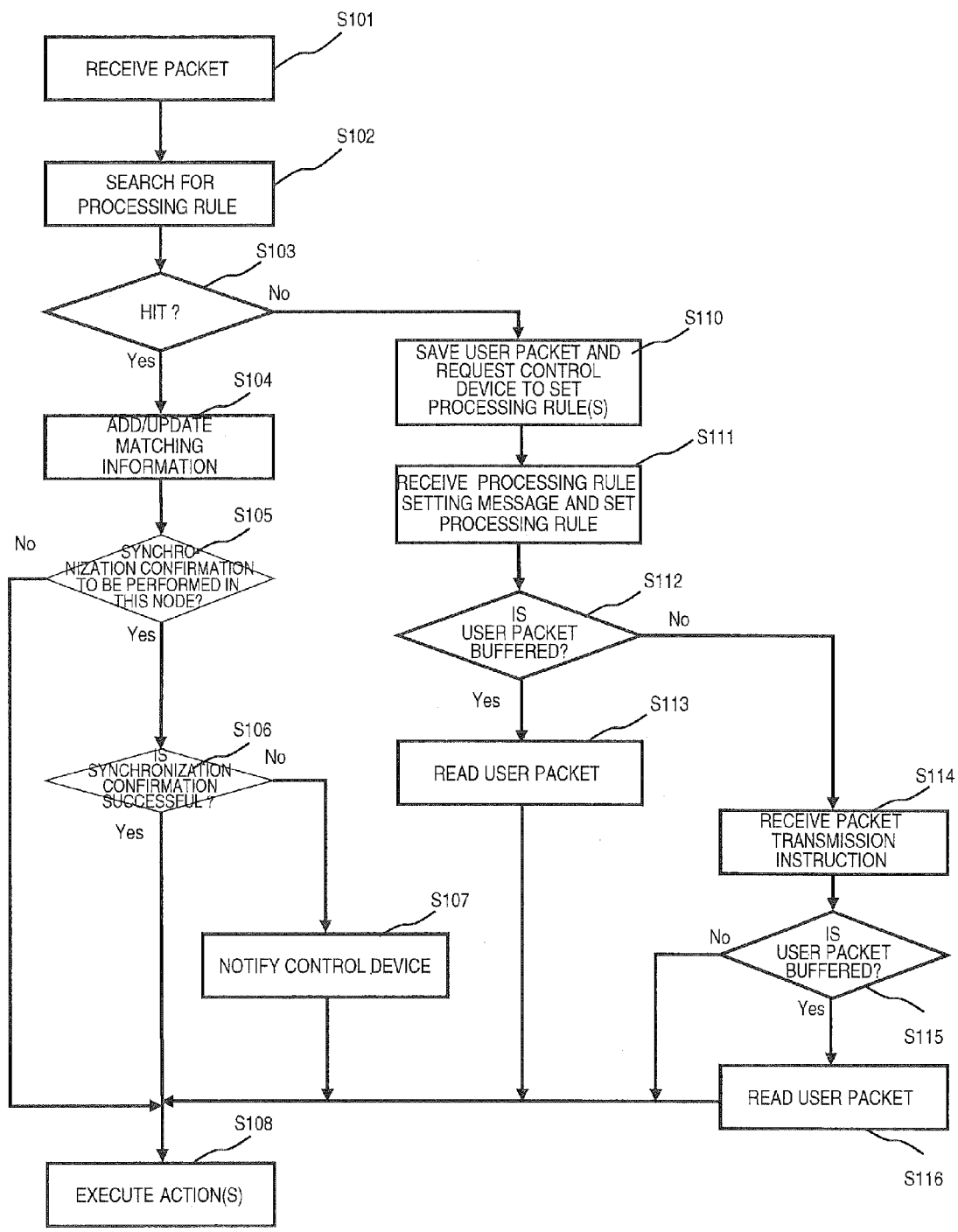
FIG. 10 is a flowchart showing the operation that is performed when the forwarding node in the first exemplary embodiment of the present disclosure receives a user packet.

FIG. 10 is a flowchart showing the operation of the forwarding node 10. Referring to FIG. 10, when a packet is received from the host (terminal) or another forwarding node 10 (step S101), the forwarding node 10 searches the processing rule storage unit 14 for a processing rule having the matching rule that matches the received packet (step S102).

If a processing rule is extracted in step S102 (Yes in step S103), the forwarding node 10 creates matching information $C_n$ (step S104). If the received packet includes the matching information $C_{n-1}$, the forwarding node 10 uses the extracted processing rule and the matching information $C_{n-1}$ to create new matching information $C_n$.

Next, the forwarding node 10 confirms if synchronization confirmation is to be performed using the generated matching information $C_n$ (step S105). Whether or not the synchronization confirmation processing is to be performed can be determined according to whether or not matching information is included in the matching information field of the processing rule extracted in step S102 described above.

If matching information is not included in the matching information field of the processing rule extracted in step S102 (No in step S105), the forwarding node 10 omits the synchronization confirmation processing and executes the actions described in the extracted processing rule (step S108).

On the other hand, if matching information is included in the matching information field of the processing rule extracted in step S102 (Yes in step S105), the forwarding node 10 performs synchronization confirmation (step S106) by comparing the matching information $C_n$, created in step S104, with the matching information stored in the matching information field of the processing rule extracted in step S102. If a match between the two pieces of matching information is confirmed in step S106 (Yes in step S106), the forwarding node 10 executes the actions described in the extracted processing rule (step S108).

On the other hand, if a mismatch between the two pieces of matching information is detected in step S106 (No in step S106), the forwarding node 10 notifies the control device 20 that a synchronization failure has occurred (step S107).

On the other hand, if the processing rule corresponding to the received packet is not found in step S103 (No in step S103), the forwarding node 10 requests the control device 20 to create processing rules, corresponding to the received packet, and to transmit the created processing rules (step S110).

In step S110, the forwarding node 10 buffers the received packet in the packet buffer 15 and, at the same time, forwards the received packet to the control device 20 to request it to create processing rules. After that, the control device 20 creates processing rules, which include the matching information, according to the procedure shown in FIG. 9.

When the processing rule setting message is received from the control device 20, the forwarding node 10 stores the processing rule in its processing rule storage unit 14 according to the processing rule setting message (step S111).

Next, the forwarding node 10 checks if the received packet is buffered in the packet buffer 15 (step S112). If the received packet is buffered (Yes in step S112), the forwarding node 10 reads the received packet (step S113) and executes the processing content (actions: add the matching information and output the received packet from the specified port) defined by the processing rule (flow entry) that has been set (step S108). This processing forwards the received packet to the next-hop forwarding node.

On the other hand, if the forwarding node 10 does not buffer the received packet (No in step S112), for example, if the forwarding node 10 does not provide the packet buffer 15, the forwarding node 10 receives the packet transmission instruction (Packet-Out) from the control device 20 (step S114).

The forwarding node 10 that has received the packet transmission instruction (Packet-Out) performs the following processing. If the packet buffer 15 is provided, the forwarding node 10 checks if the packet is buffered in the packet buffer 15 (step S115). If the packet is buffered (Yes in step S115), the forwarding node 10 reads the packet (step S116) and executes the processing content (actions; in this case, add the matching information and output from the specified port or search the processing rule storage unit 14) which is received with the packet transmission instruction (Packet-Out) (step S108). If the packet is not buffered (No in step S115), the forwarding node 10 executes the processing content (actions; in this case, assign the matching information and output from the specified port or search the processing rule storage unit 14), which is received with the packet transmission instruction (Packet-Out), for the packet received with the packet transmission instruction (Packet-Out) (step S108). This processing forwards the received packet to the next-hop forwarding node.

Figure 11:
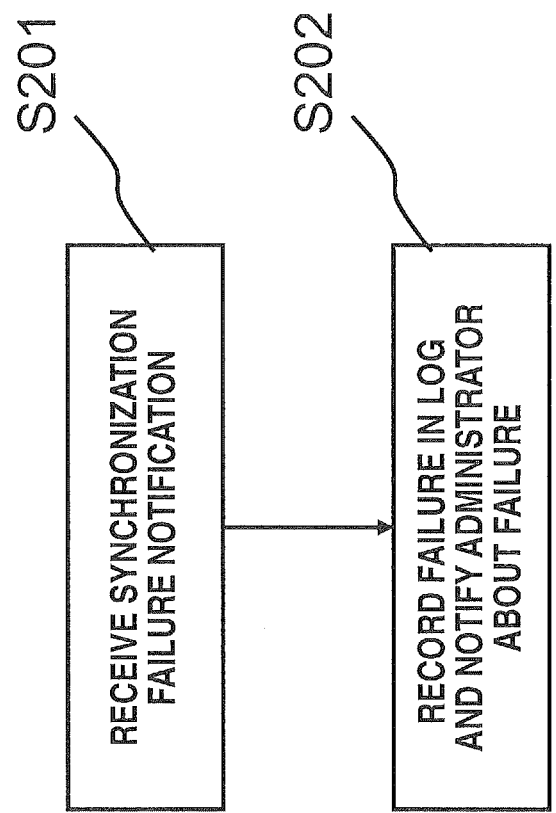
FIG. 11 is a flowchart showing the operation that is performed when the control device in the first exemplary embodiment of the present disclosure receives a synchronization failure notification.

FIG. 11 is a flowchart showing the operation of the control device 20 when the forwarding node 10 notifies a synchronization failure to the control device 20 in step S107 described above. As shown in FIG. 11, when a synchronization failure is received from the forwarding node 10 (step S201), the control device 20 records the content as a synchronization failure log and, at the same time, notifies the content to a terminal of a predetermined network administrator etc. (step S202).

Figure 12:
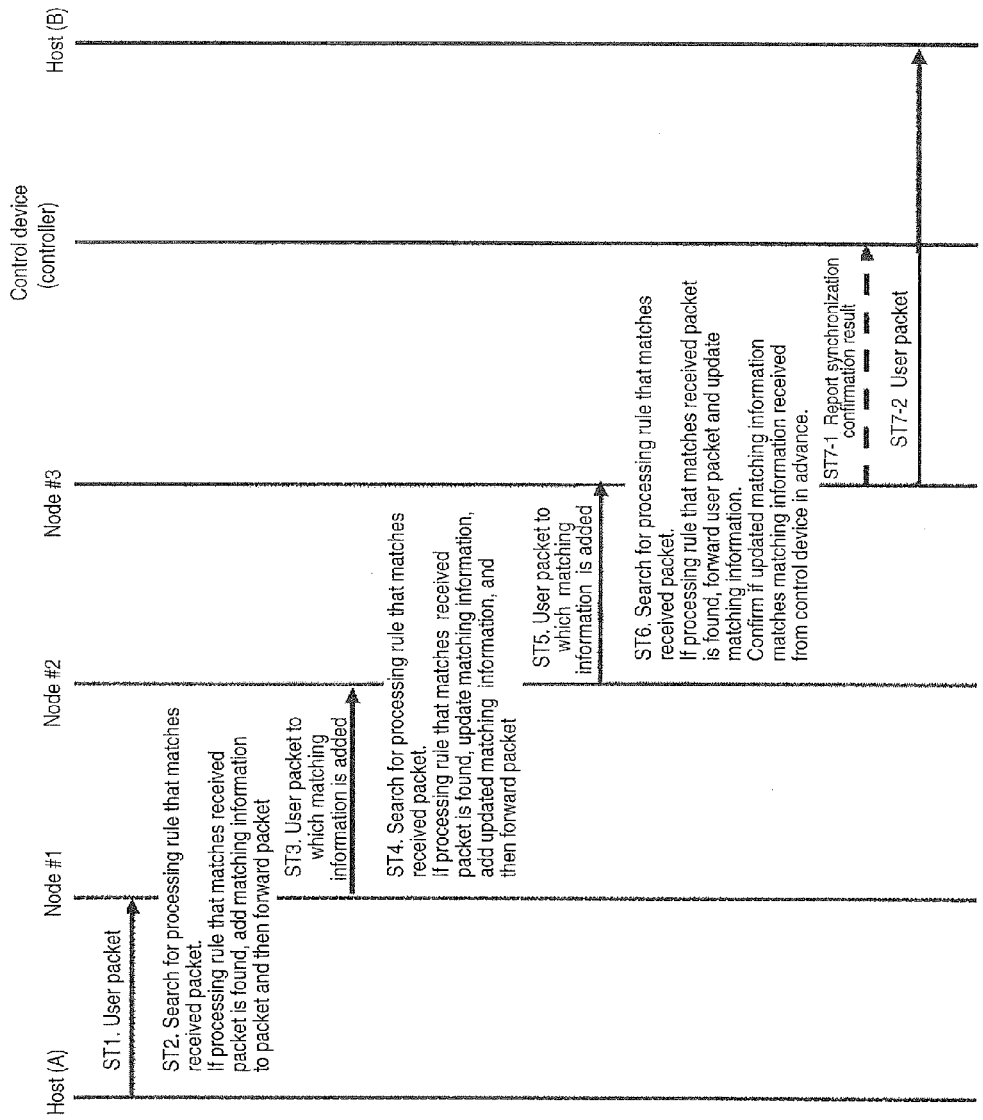
FIG. 12 is a diagram showing an example of the operation sequence in the first exemplary embodiment of the present disclosure.
Figure 13:
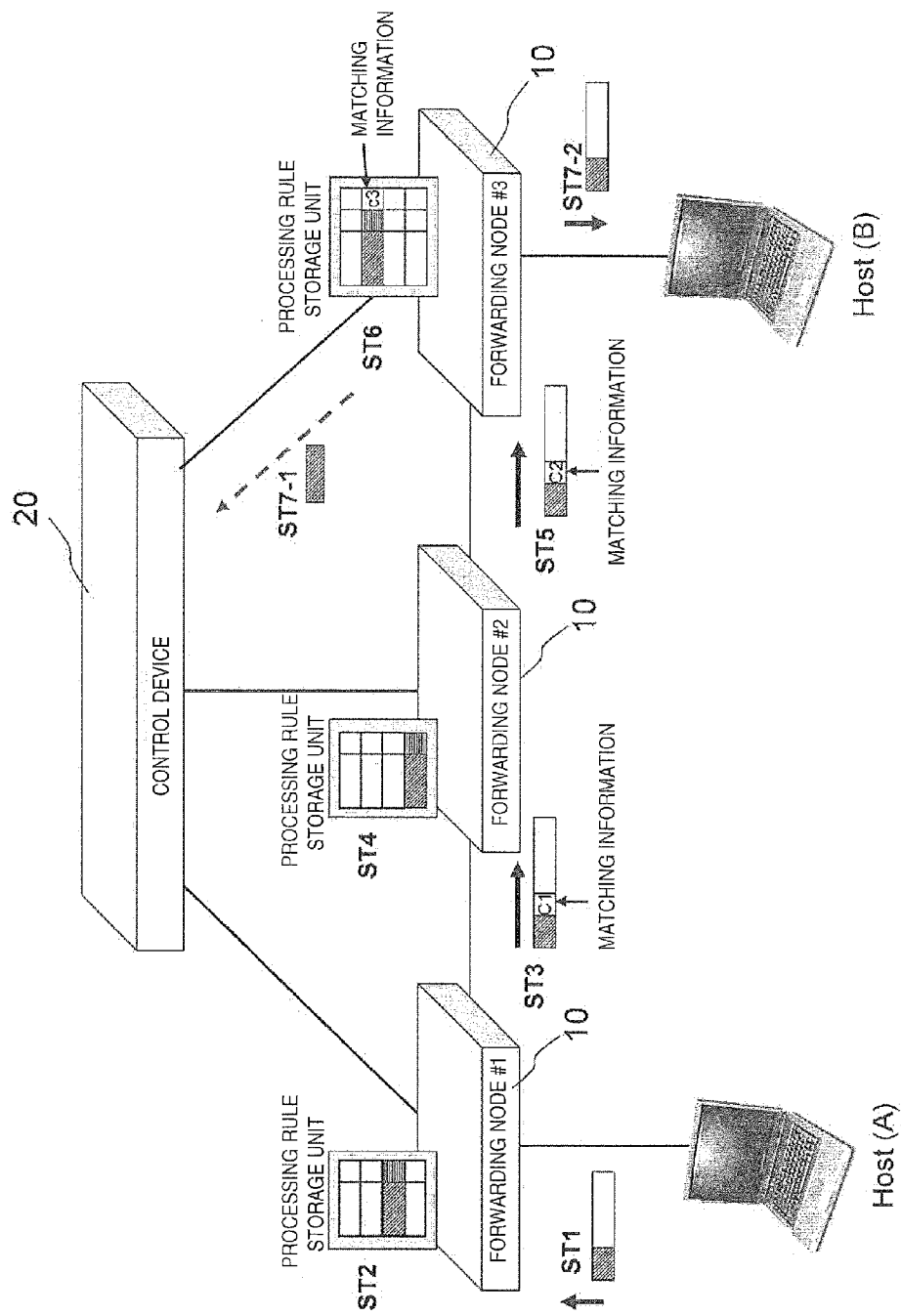
FIG. 13 is a diagram showing the operation corresponding to the sequence shown in FIG. 10.

Next, the following describes the sequence of operations of the forwarding node 10 and the control device 20 more in detail with reference to the sequence diagram in FIG. 12 and the reference diagram in FIG. 13. In the description below, it is assumed that the control device 20 has set processing rules with no matching information in the processing rule storage unit 14 of forwarding nodes #1 and #2 and that processing rules with matching information is set in the processing rule storage unit 14 of forwarding node #3.

As shown in FIG. 12 and FIG. 13, when Host(A) sends a packet, which is addressed to Host(B), to forwarding node #1 (ST1 in FIG. 12 and FIG. 13), forwarding node #1 extracts the processing rule, corresponding to the packet, from the processing rule storage unit 14 (ST2 in FIG. 12 and FIG. 13), creates matching information C1 using the content, and forwards the packet to forwarding node #2 with the created matching information C1 added to the received packet (ST3 in FIG. 12 and FIG. 13).

Forwarding node #2, which receives the packet from forwarding node #1, extracts the processing rule, corresponding to the received packet, from the processing rule storage unit 14 (ST4 in FIG. 12 and FIG. 13), creates the matching information C2 using the content and the matching information C1 included in the received packet, forwards the packet to forwarding node #3 with the created matching information C2 added to the received packet (ST5 in FIG. 12 and FIG. 13).

Similarly, forwarding node #3, which receives the packet from forwarding node #2, extracts the processing rule, corresponding to the received packet, from the processing rule storage unit 14 (ST6 in FIG. 12 and FIG. 13) and creates the matching information C3 using the content and the matching information C2 included in the received packet. In addition, because the matching information c3 is included in the extracted processing rule, forwarding node #3 confirms if the created matching information C3 matches the matching information c3 included in the extracted processing rule.

In this exemplary embodiment, the matching information C3 is generated from the processing rules that are applied in the forwarding nodes via which the packet has passed. Therefore, if the processing rules, which are set in forwarding nodes #1-#3, are not synchronized with the processing rules held in the control device 20, the matching information C3 created by forwarding node #3 does not match the matching information c3 included in the processing rule. In this case, as described in step S107 in FIG. 10 described above, forwarding node #3 notifies a synchronization failure to the control device 20 (ST7-1 in FIG. 12 and FIG. 13).

On the other hand, if the matching information C3, created by forwarding node #3, matches the matching information c3 included in the processing rule, it is determined that the processing rules, which are set in forwarding nodes #1-#3 are synchronized with the processing rules held in the control device 20. In this case, forwarding node #3 deletes the matching information C2 from the packet received from forwarding node #2 and then forwards the packet to the host (B) (ST7-2 in FIG. 12 and FIG. 13).

As described above, the synchronization state of the processing rules between the forwarding node 10 and the control device 20 can be confirmed in this exemplary embodiment without need for the forwarding node 10 and the control device 20 to transmit and receive the processing rules directly between them.

In addition, the matching information is generated in this exemplary embodiment using processing rules as shown by (Expression 1) and (Expression 2) given above. Therefore, even if an unintended processing rule is used on a forwarding node on the path and the packet is forwarded, the error can be detected.

(Second exemplary embodiment)

Next, a second exemplary embodiment of the present disclosure will be described in detail with reference to the drawings. Although matching information is added to a packet via the matching information storage header in the first exemplary embodiment of the present disclosure described above, the matching information can also be included in a packet without using the additional header. The following describes the second exemplary embodiment in which matching information is included in a packet without using the additional header. Because the basic configuration of a forwarding node 10 and a control device 20 in the second exemplary embodiment is the same as that of the first exemplary embodiment, the following describes the second exemplary embodiment with emphasis on the difference.

Figure 14:
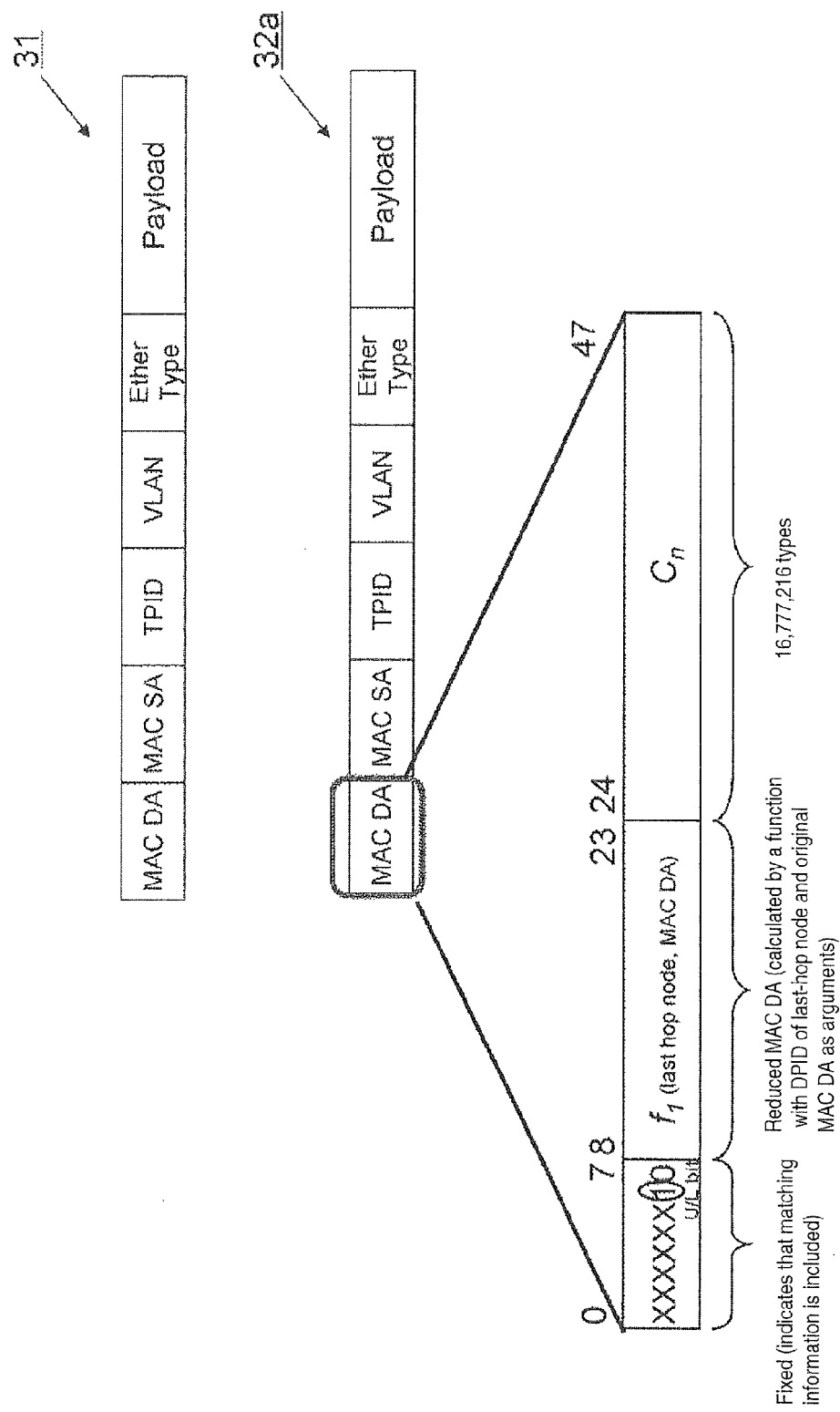
FIG. 14 is a diagram showing an example of a packet in which matching information is embedded in the packet header.

FIG. 14 is a diagram showing a packet generated by the forwarding node 10 in this exemplary embodiment. The reference numeral 31 indicates a user packet transmitted from Host(A) or Host(B). The reference numeral 32*a* shows the configuration of a packet in which matching information is embedded. In the example in FIG. 14, the packet has the configuration in which the 48-bit information, shown in the bottom of FIG. 14, is written in the MAC DA field. In the example in FIG. 14, the 8-bit fixed data indicating that matching information is included, the function $f_1$ (DPID of last-hop node, original MAC DA), and the matching information C, are written.

This exemplary embodiment is different from the first exemplary embodiment described above in that the original MAC DA must be reduced and restored in the forwarding node 10 of the first hop and the last hop, however, in that the overhead is reduced because the additional header is not used. Note that the packet configuration shown in FIG. 14 is exemplary only and that the field used for storing the matching information, the contents of matching information, and the function for reducing the original data may be changed as necessary.

As described above, the present disclosure may be implemented in the mode in which matching information is included in a particular field of an existing packet.

(Third exemplary embodiment)

Next, a third exemplary embodiment of the present disclosure will be described. In the examples of the exemplary embodiments described above, processing rules are used to generate matching information. In the third exemplary embodiment, another example of generating matching information is described.

The matching information may be generated using the identifier of a forwarding node 10 (for example, ID or MAC address assigned to the forwarding node 10). To calculate the matching information using the identifier (DPID) of the forwarding node 10, (Expression 3) and (Expression 4) given below can be used.

$$C_n = f(C_{n-1}, DPID_n) \quad \text{(Expression 3)}$$

$$C_n = \{h_n, h_{n-1}, h_{n-2}, h_{n-3}, \ldots h_0\}$$

$$h_n = f(DPID_n) \quad \text{(Expression 4)}$$

In the above expressions, Cn is the matching information generated by the n-th forwarding node #n on the packet forwarding path, and Cn−1 is the matching information generated by the (n−1)th forwarding node #n−1 and included in the received packet. DPIDn is the identifier of the n-th forwarding node #n on the packet forwarding path. As the function f(x), a hash function such as MD5 may be used. The use of such a hash function makes the matching information Cn become a value that uniquely represents a combination of forwarding nodes via which the user packet has passed in the forwarding process.

The matching information may be generated using the ID of a table (table ID) stored in the processing rule storage unit 14. The matching information is calculated by substituting the table ID of forwarding node n in (Expression 3) and (Expression 4).

The matching information may also be generated using the ID of the link (link ID) between forwarding nodes. When the ID of the link, via which forwarding node n forwards a packet, is represented as link IDn, the matching information may be generated by substituting link IDn in (Expression 3) and (Expression 4).

The generation example of matching information described in this exemplary embodiment may be used to confirm whether a packet forwarded among the forwarding nodes 10 is forwarded via the packet forwarding path determined by the control device 20. That is, the synchronization between the control device 20 and the forwarding node 10 can be confirmed at a granularity different from that in the first exemplary embodiment and the second exemplary embodiment. The granularity of synchronization confirmation between the forwarding node 10 and the control device 20 may be changed dynamically. For example, the control device 20 may change the granularity of synchronization confirmation dynamically in such a way that the matching information that has been generated using processing rules will be generated using the identifier of the forwarding node 10 as described in this exemplary embodiment. This configuration allows the system administrator to dynamically change the granularity of synchronization confirmation test as necessary.

While the exemplary embodiments of the present disclosure have been described, it is to be understood that the present disclosure is not limited to the exemplary embodiments described above and that further modifications, replacements, and adjustments may be added within the scope not departing from the basic technological concept of the present disclosure. For example, based on an instruction from the control device 20, the forwarding node 10 may change whether to generate the matching information described above or change its generation method. In addition, the control device 20 may instruct the generation of matching information based on a pre-created schedule and, after that, set a processing rule in which the matching information is set, thereby allowing various types of test and sampling to be performed.

Although the forwarding node 10 performs synchronization confirmation based on the matching information in the exemplary embodiments described above, it is also possible, as described before in the outline, that the forwarding node 10 positioned at any arbitrary location forwards matching information to the control device 20 to allow the control device 20 to perform synchronization confirmation. The transmission of matching information described above may be implemented easily by adding an action, which forwards the matching information, to the processing rule of the corresponding forwarding node concerned.

It is also possible for the control device 20 to switch the component (forwarding node 10/control device 20) that performs synchronization confirmation based on the matching information.

Although the last-hop node removes the additional header or restores the MAC DA field in the second exemplary embodiment described above, another configuration is also possible in which the host side performs this processing.

As the verification information described in the exemplary embodiments above, the information generated by the controller to uniquely identify a flow entry, such as Flow Cookie in Non Patent Literature 2, may be used.

Finally, preferred modes of the present invention will be summarized.

[Mode 1]

(See the communication system according to the first aspect)

[Mode 2]

The communication system as defined by mode 1, wherein if the matching information is included in the received packet, said matching information processing unit uses the matching information and the information on processing for the received packet to generate matching information and adds the generated matching information to the received packet, and whether said forwarding node and said control device are synchronized is confirmed according to whether the matching information added to the received packet matches pre-calculated matching information corresponding to the forwarding path.

[Mode 3]

The communication system as defined by mode 1 or 2, wherein said control device notifies the pre-calculated matching information to a predetermined forwarding node among a plurality of forwarding nodes, and said predetermined forwarding node confirms, using the notified matching information, if said forwarding node and said control device are synchronized.

[Mode 4]

The communication system as defined by one of mode 1 or 2, wherein a predetermined forwarding node among a plurality of forwarding nodes transmits the matching information to said control device and said control device confirms if said forwarding node and said control device are synchronized.

[Mode 5]

The communication system as defined by mode 1 or 2, further comprising a synchronization confirmation device that comprises said confirmation unit.

[Mode 6]

The communication system as defined by one of modes 1-5, wherein said forwarding node can generate the matching information.

[Mode 7]

The communication system as defined by one of modes 1-6, wherein the matching information represents information related to at least one of a processing rule corresponding to the received packet, identification information on the forwarding node, and link information corresponding to the forwarding path.

[Mode 8]

(See the forwarding node according to the second aspect)

[Mode 9]

The forwarding node as defined by mode 8, wherein if the matching information is included in the received packet, said matching information processing unit uses the matching information and the information on processing for the received packet to generate matching information and adds the generated matching information to the received packet.

[Mode 10]

The forwarding node as defined by mode 8 or 9, wherein the matching information can be generated.

[Mode 11]

The forwarding node as defined by one of modes 8 to 10, wherein the matching information represents information corresponding to at least one of a processing rule corresponding to the received packet, identification information on the forwarding node, and link information corresponding to the forwarding path.

[Mode 12]

The forwarding node as defined by one of modes 8 to 11, wherein the pre-calculated matching information is received from said control device.

[Mode 13]

(See the control device according to the third aspect)

[Mode 14]

(See the communication control method according to the fourth aspect)

[Mode 15]

(See the computer program according to the fifth aspect)

The entire disclosures of Patent Literatures and Non Patent Literatures given above are hereby incorporated by reference into this specification. The exemplary embodiments and the examples may be changed and adjusted in the scope of the entire disclosure (including claims) of the present invention and based on the basic technological concept. Within the scope of the claims of the present invention, various disclosed elements may be combined and selected in a variety of ways.

REFERENCE SIGNS LIST

10 Forwarding node
11 Forwarding processing unit
12 Control device communication unit
13 Processing rule management unit
14 Processing rule storage unit
15 Packet buffer
20 Control device
21 Node communication unit
22 Control message processing unit
23 Topology management unit
24 Path/action calculation unit
25 Processing rule management unit
25A Synchronization confirmation unit
27 Matching information generation unit
28 Processing rule storage unit
31 User packet
32,32a Packet with matching information
33 Matching information storage header
111 Processing rule search unit
112 Action execution unit
113 Matching information processing unit
221 Message analysis/processing unit
222 Message generation unit

What is claimed is:

1. A communication system, comprising:
a control device that sets a forwarding path of a packet and determines processing rules corresponding to the forwarding path and calculates a matching information, which represents information on processing for the received packet;
a forwarding node that includes a processing unit that processes a received packet by a processing rule transmitted from said control device, and a matching information processing unit that adds the matching information, transmitted from said control device, to the received packet and forwards the received packet; and
a confirmation unit that confirms if said forwarding node and said control device are synchronized according to whether the matching information added to the received packet matches pre-calculated matching information calculated by said forwarding node which receives the packet.

2. The communication system as defined by claim 1, wherein
if the matching information is included in the received packet, said matching information processing unit uses the matching information and the information on processing for the received packet to generate matching information and adds the generated matching information to the received packet, and
whether said forwarding node and said control device are synchronized is confirmed according to whether the matching information added to the received packet matches pre-calculated matching information corresponding to the forwarding path.

3. The communication system as defined by claim 2, wherein
said control device notifies the pre-calculated matching information to a predetermined forwarding node among a plurality of forwarding nodes, and
said predetermined forwarding node confirms, using the notified matching information, if said forwarding node and said control device are synchronized.

4. The communication system as defined by claim 2, wherein
a predetermined forwarding node among a plurality of forwarding nodes transmits the matching information to said control device and
said control device confirms if said forwarding node and said control device are synchronized.

5. The communication system as defined by claim 1, wherein
said control device notifies the pre-calculated matching information to a predetermined forwarding node among a plurality of forwarding nodes, and
said predetermined forwarding node confirms, using the notified matching information, if said forwarding node and said control device are synchronized.

6. The communication system as defined by claim 1, wherein
a predetermined forwarding node among a plurality of forwarding nodes transmits the matching information to said control device and
said control device confirms if said forwarding node and said control device are synchronized.

7. The communication system as defined by claim 1, further comprising a synchronization confirmation device that comprises said confirmation unit.

8. The communication system as defined by claim 1, wherein said forwarding node can generate the matching information.

9. The communication system as defined by claim 1, wherein
the matching information represents information related to at least one of a processing rule corresponding to the received packet, identification information on the forwarding node, and link information corresponding to the forwarding path.

10. The communication system as defined by claim 1, further comprising a synchronization confirmation device that comprises said confirmation unit.

11. The communication system as defined by claim 1, wherein the confirmation unit confirms the synchronization status of the processing rules through comparing the matching information.

12. The communication system as defined by claim 1, wherein when there is determined a mismatch between the matching information and pre-calculated matching information, the forwarding node notifies the control device of a synchronization failure.

13. A forwarding node, comprising:
a processing unit that processes a received packet by a processing rule transmitted from a control device;
a matching information processing unit that adds matching information, transmitted from a control device, to the received packet and forwards the received packet, the control device calculates the matching information which represents information on processing for the received packet; and
a confirmation unit that confirms if said forwarding node and said control device are synchronized according to whether the matching information added to the received packet matches pre-calculated matching information calculated by said forwarding node which receives the packet.

14. The forwarding node as defined by claim 13, wherein if the matching information is included in the received packet, said matching information processing unit uses the matching information and the information on processing for the received packet to generate matching information and adds the generated matching information to the received packet.

15. The forwarding node as defined by claim 14, wherein the matching information can be generated.

16. The forwarding node as defined by claim 14, wherein the matching information represents information corresponding to at least one of a processing rule corresponding to the received packet, identification information on the forwarding node, and link information corresponding to the forwarding path.

17. The forwarding node as defined by claim 13, wherein the matching information can be generated.

18. The forwarding node as defined by claim 13, wherein the matching information represents information corresponding to at least one of a processing rule corresponding to the received packet, identification information on the forwarding node, and link information corresponding to the forwarding path.

19. The forwarding node as defined by claim 13, wherein the pre-calculated matching information is received from said control device.

20. A control device, comprising:
a unit that sets a forwarding path of a packet and forwards processing rules corresponding to the forwarding path to forwarding nodes that process the packet by the processing rules, and calculates matching information, which represents information on processing for a received packet;
a receiving unit that receives matching information, which represents the information on processing for the received packet, from a forwarding node that processes the received packet by the processing rule, the forwarding node adds the matching information, transmitted from said unit of the control device, to the received packet and forwards the received packet; and
a confirmation unit that confirms if said forwarding node and said control device are synchronized according to whether the matching information, received from the forwarding node, matches pre-calculated matching information calculated by the forwarding node which receives the packet.

21. A communication control method, comprising:
generating, by a forwarding node, matching information and adding the generated matching information to a received packet, the forwarding node performing packet processing according to a processing rule that is set by a control device, the control device calculates matching information, which represents information on processing for the received packet; and
confirming if said forwarding node and said control device are synchronized according to whether the matching information added to the received packet matches pre-calculated matching information calculated by said forwarding node which receives the packet.

22. A non-transient computer-readable storage medium storing a program, that causes a computer, installed on a forwarding node that performs packet processing according to processing rules that are set by a control device, to execute processings of, comprising:

adding matching information to received packets, the matching information, transmitted from the control device, the matching information representing information on processing for the received packets; and confirming if said forwarding node and said control device are synchronized according to whether the matching information added to the received packets match pre-calculated matching information calculated by said forwarding node which receives the packet.

* * * * *